US008875208B1

(12) United States Patent
Abkairov et al.

(10) Patent No.: US 8,875,208 B1
(45) Date of Patent: Oct. 28, 2014

(54) HIGH QUALITY MULTIMEDIA TRANSMISSION FROM A MOBILE DEVICE FOR LIVE AND ON-DEMAND VIEWING

(75) Inventors: Nikolay Abkairov, Moscow (RU); Alexey Timanovsky, Moscow (RU)

(73) Assignee: Skype, Dublin (IE)

( * ) Notice: Subject to any disclaimer, the term of this patent is extended or adjusted under 35 U.S.C. 154(b) by 1353 days.

(21) Appl. No.: 12/276,171

(22) Filed: Nov. 21, 2008

Related U.S. Application Data

(60) Provisional application No. 60/989,711, filed on Nov. 21, 2007, provisional application No. 60/989,716, filed on Nov. 21, 2007, provisional application No. 61/082,457, filed on Jul. 21, 2008, provisional application No. 61/106,131, filed on Oct. 16, 2008, provisional application No. 61/106,133, filed on Oct. 16, 2008.

(51) Int. Cl.
*H04N 7/173* (2011.01)
*G06F 15/16* (2006.01)

(52) U.S. Cl.
USPC ........... 725/115; 725/114; 709/233; 709/234; 709/235

(58) Field of Classification Search
CPC .............. H04N 21/23; H04N 21/2343; H04N 21/234309; H04N 21/234327; H04N 21/238; H04N 21/2393; H04N 21/437; H04N 21/438; H04N 21/47202; H04N 21/60; H04N 21/631; H04N 21/64761; H04N 21/64769; H04N 21/234345; H04N 21/2355
USPC ................... 375/240, 240.01–240.07, 240.1, 375/240.11, 240.12–240.24; 341/50–51; 370/229, 232, 235, 236; 348/192, 348/400.1, 401.1, 402.1, 409.1, 410.1, 348/413.1, 416.1; 709/233–235; 725/105, 725/115
See application file for complete search history.

(56) References Cited

U.S. PATENT DOCUMENTS

| 5,768,527 A | 6/1998 | Zhu et al. |
|---|---|---|
| 7,342,880 B2 * | 3/2008 | Yanagihara et al. .......... 370/232 |
| 2002/0190876 A1 * | 12/2002 | Lai et al. .......................... 341/50 |
| 2003/0058931 A1 * | 3/2003 | Zhang et al. ............. 375/240.01 |
| 2003/0118107 A1 * | 6/2003 | Itakura et al. ............. 375/240.19 |

(Continued)

OTHER PUBLICATIONS

Lankow, G., "Implementation of a Real-Time Multimedia Streaming Protocol over Network" 2004, 31 pages.
Wu, D. et al., "Streaming Video over the Internet: Approaches and Directions" 2001 IEEE (pp. 282-300).

(Continued)

*Primary Examiner* — Hai V Tran
(74) *Attorney, Agent, or Firm* — Sonia Cooper; Jim Ross; Micky Minhas

(57) ABSTRACT

Techniques are provided for transmitting high quality multimedia data from a mobile device for live and on-demand viewing. The mobile device adjusts the quality of a single multimedia data stream based on one or more factors, such as the available bandwidth of a wireless link with a server, whether there are any "live" subscribers of the multimedia data stream, whether any "live" subscribers are interacting with the mobile device, and a change in the privacy settings of the user of the mobile device. Any data that was removed from the multimedia data stream before it was transmitted to a server is subsequently sent to the server. The server generates multiple versions of the multimedia data stream that vary in terms of quality. The server selects which version of the multimedia data stream to transmit to a subscriber of the multimedia data stream based on one or more criteria.

20 Claims, 5 Drawing Sheets

(56) References Cited

U.S. PATENT DOCUMENTS

| | | |
|---|---|---|
| 2004/0008253 A1 | 1/2004 | Monroe |
| 2006/0005101 A1* | 1/2006 | Li et al. ............... 714/758 |
| 2007/0088603 A1 | 4/2007 | Jouppi et al. |
| 2007/0143493 A1 | 6/2007 | Mullig et al. |
| 2008/0101476 A1* | 5/2008 | Tian et al. ............ 375/240.26 |
| 2008/0195664 A1 | 8/2008 | Maharajh et al. |

OTHER PUBLICATIONS

"Final Office Action", U.S. Appl. No. 12/896,728, (Mar. 26, 2013), 23 pages.

"Non-Final Office Action", U.S. Appl. No. 12/896,728, (Oct. 9, 2012), 20 pages.

"Notice of Allowance", U.S. Appl. No. 12/896,728, Jun. 12, 2014, 14 pages.

\* cited by examiner

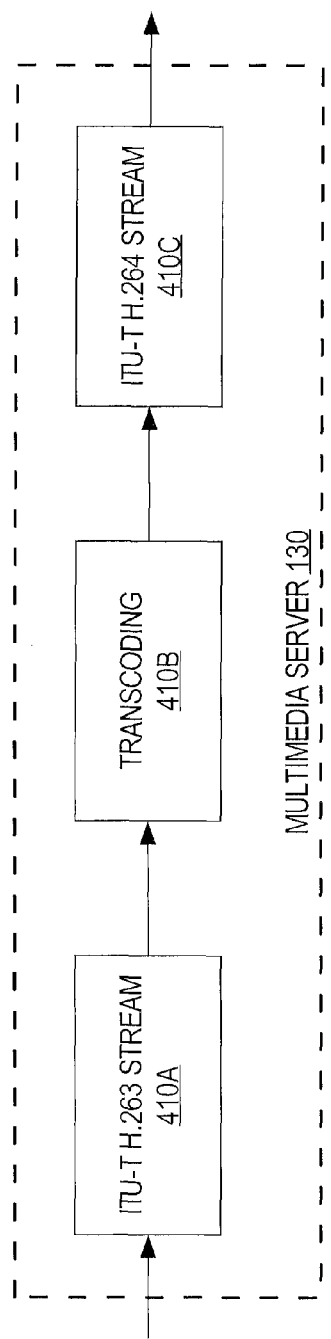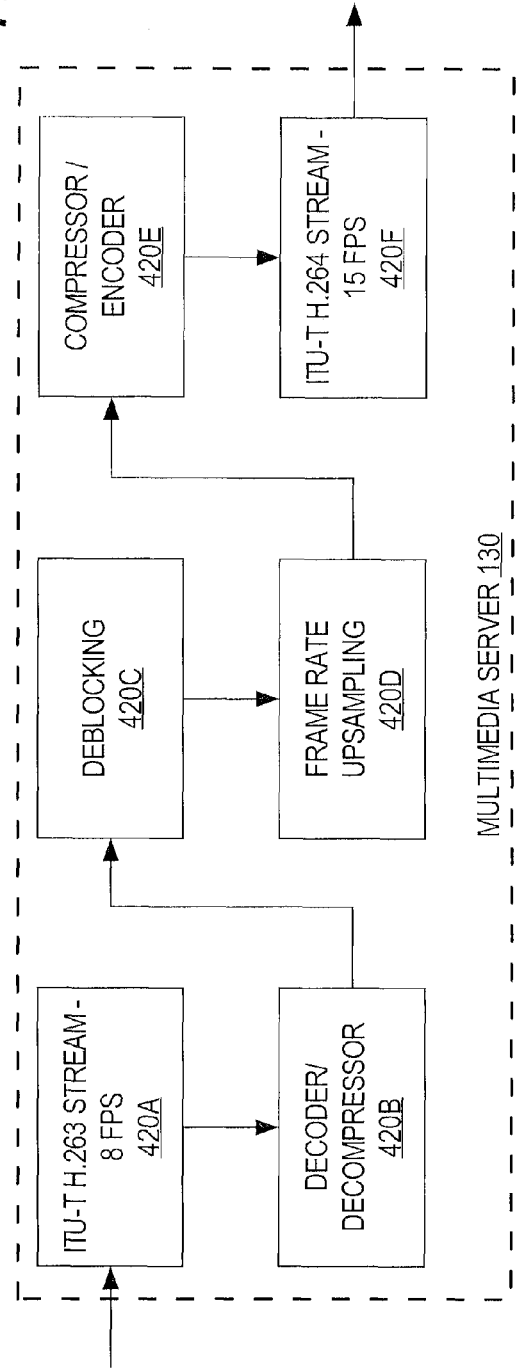
FIG. 4A LOW LATENCY TRANSFORMATION
FIG. 4B FULL QUALITY TRANSFORMATION

HIGH QUALITY MULTIMEDIA TRANSMISSION FROM A MOBILE DEVICE FOR LIVE AND ON-DEMAND VIEWING

CROSS-REFERENCE TO RELATED APPLICATIONS

This application is related to and claims the benefit of priority from U.S. Provisional Application No. 60/989,711 filed on Nov. 21, 2007, entitled "High Quality Multimedia Transmission From Mobile IP Devices For Live And On-Demand Viewing"; U.S. Provisional Application No. 60/989,716 filed on Nov. 21, 2007, entitled "System For Simple And Direct User Registration And Product Usage For online Products Or Service Offerings"; U.S. Provisional Application No. 61/082,457 filed on Jul. 21, 2008, entitled "Transactional Mobile Video Streaming"; U.S. Provisional Application No. 61/106,131 filed on Oct. 16, 2008, entitled "Segmented Streaming"; and U.S. Provisional Application No. 61/106,133 filed on Oct. 16, 2008, entitled "Phone-To-Phone Streaming" the entire contents of each of which are incorporated by this reference for all purposes as if fully disclosed herein.

FIELD OF THE INVENTION

The present invention relates to the transmission and processing of multimedia from mobile devices for both live and on-demand viewing.

BACKGROUND

There are a number of IP-based mobile devices that are able to (1) capture and locally record on the device pictures and multimedia content (defined as video and audio) and (2) transmit data from the device to another IP-based device or server accessible via (or simply "on") the Internet. Examples of such devices include camera phones and cameras (e.g. camcorders) with an IP endpoint.

There are a number of technical challenges and limitations that need to be overcome to achieve high quality multimedia transmission from mobile devices for live and on-demand viewing on other mobile devices or personal computers (PCs). Such technical challenges include the following.

First, live (i.e., real-time) multimedia streaming requires low latency (or delay) at each point in the transmission, i.e., (a) from the sending client at capture time (b) through the client software on the sending client, (c) through the servers on the Internet that perform any needed transcoding, and (d) to the receipt and rendering of the multimedia data streams on rendering applications (e.g., browsers and media players) that run on receiving mobile devices, PCs, or other devices.

Second, engineering systems to deliver video in real-time with minimal latency can conflict with delivering the best possible quality video for playback. It is technically challenging to both optimize real-time streaming quality and experience for users viewing streams live and optimize the quality of the streams for a playback mode. Users may desire the same data stream to be both available live and for playback without compromises to either quality or latency.

Third, the available wireless links can have limited bandwidth as well as varying available bandwidth during the course of a single multimedia capture session.

Fourth, there is limited space on the sending mobile device for temporarily or permanently storing the multimedia files.

Fifth, there is limited computational and battery capacity on the sending mobile device that needs to be optimally utilized.

Sixth, there are different types of codecs with differing technical characteristics on the various sending and receiving endpoints.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 4A-B are block diagrams that depict multimedia stream transformations performed by a multimedia server relative to either a live or recorded transmission, according to an embodiment of the invention.

DETAILED DESCRIPTION

Figure 1:
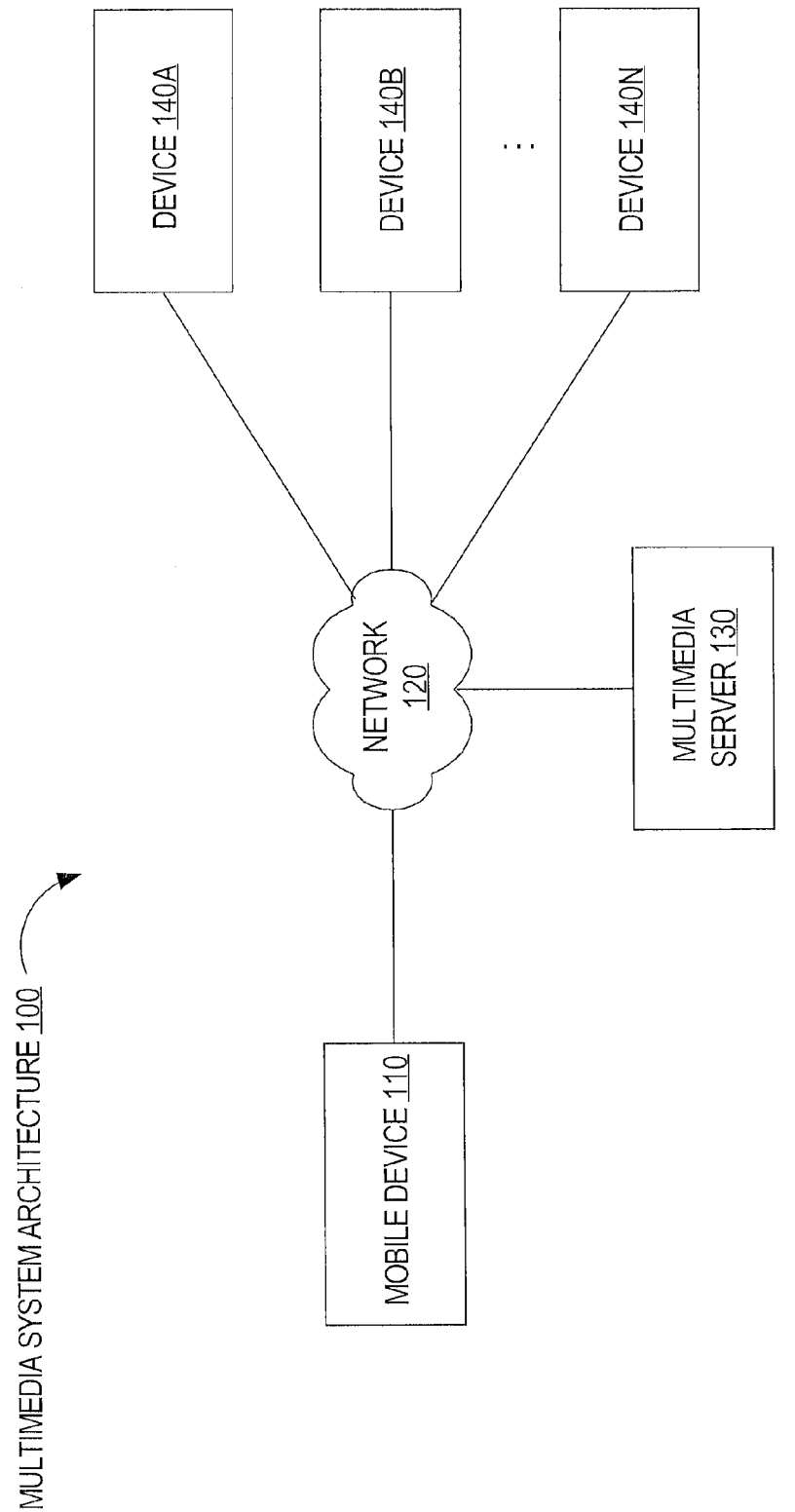
FIG. 1 is a block diagram that depicts an example multimedia system architecture 100, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Goals

In light of the challenges described in the Background section, two primary goals of embodiments of the invention are (1) enable high quality real-time (i.e. low latency, but keeping sending bit rate as high as data connection allows) capturing and streaming of multimedia data from mobile devices to servers and other devices on the Internet, including to other (e.g., IP-based) mobile devices, while (2) delivering higher quality video for playback later on by progressive gradual enhancement of the initial live stream by transmitting incremental multi-media data after live transmission. Thus, while the first goal is to deliver multimedia with minimal delay with high quality limited, e.g., by varying data channel capacity, the second goal is to deliver highest possible quality of video limited, e.g., by device/codec capacity or user preferences. Both goals are to be achieved from a single multimedia capture.

Additional goals of certain embodiments of the invention include (a) optimizing the amount of data stored on a source mobile device (as the space may be limited) and (b) optimizing the amount of data sent over the network to conserve battery life on the source mobile device.

The "quality" of multimedia streaming, live or recorded, is determined by various factors. Non-limiting examples of such factors include the resolution of the video, the number of frames per second, the lack of interruptions in video and audio, and the fidelity of the video and audio information transmitted.

General Overview

Techniques are provided herein for processing multimedia data at and from mobile devices. A mobile device that captures video and audio data and generates a live stream must adapt to a constrained environment, which includes memory, power consumption, CPU, and a data network. Each of these resources is limited and thus should be taken into account when streaming multimedia data for live and on-demand viewing.

Accordingly, a mobile device adjusts the quality and/or latency of a multimedia data stream during and/or after a live transmission of the multimedia data stream. For example, a mobile device might attempt to transmit a multimedia data stream at the highest possible quality. In response to delays, e.g., in the network, some of the multimedia data from the data stream might not be sent to a multimedia server over the network. The live transmission continues despite some data being removed from the data stream before transmission from the mobile device. Subsequently, however, this "omitted" data may be transmitted to the multimedia server, either during or after a live transmission. The multimedia server is able to use this omitted data to enhance the quality of the live transmission and make the multimedia data stream suitable for on-demand (i.e., non-live) viewing.

A mobile device may also adjust the quality and/or latency of a multimedia data stream in response to the demands of consumers (or viewers) of the multimedia data stream. For example, in one embodiment, if no one is viewing the multimedia data stream in a live mode, then the mobile device will transmit the multimedia data stream in as high a quality as possible until a viewer subscribes to a live viewing of the data stream. At that point, the mobile device begins transmitting the data stream in a live mode and may be required to skip frames and/or remove portions of frames from the unsent portion of the multimedia data stream in order to meet latency requirements.

A real-time or "live" transmission of a data stream from a mobile device refers to the sending of data near or at the same time that the data is captured. Thus, a live transmission of a data stream is associated with low latency, e.g., less than one second between the capturing of the data on a mobile device to the transmission of the data from the mobile device. Additionally, latency or delay may be caused by any intermediate devices, such as any servers that further process the data or network devices that forward the data through a network. In order to be considered a "live" transmission, the data must be transmitted from a mobile device without exceeding a predefined latency threshold (e.g., 0.5 seconds between capture and transmission) even though some data may be skipped for transmission in "live" mode.

Multimedia System Architecture

FIG. 1 is a block diagram that depicts an example multimedia system architecture 100, according to an embodiment of the invention. Multimedia system architecture 100 comprises mobile device 110, network 120, multimedia server 130, and devices 140A-N.

Mobile device 110 captures images and generates a video stream from the captured images. Additionally or alternatively, mobile device 110 captures audio and generates an audio stream from the captured audio. Mobile device 110 may be a phone, personal digital assistant (PDA), laptop, or other mobile device that includes a video and/or audio recorder. For purposes of brevity, the remaining description refers to multimedia, which includes both video and audio, even though certain embodiments of the invention also may include the capturing and transmission of only video data and only audio data.

Mobile device 110 is communicatively coupled to multimedia server 130 via network 120. Similarly, devices 140A-N are communicatively coupled to multimedia server 130 via network 120. However, the network between mobile device 110 and multimedia server 130 may be different than the network between multimedia server 130 and one or more of devices 140A-N.

Network 120 may be implemented by any medium or mechanism that provides for the exchange of data between mobile device 110 and devices 140A-N and multimedia server 130. Non-limiting examples of network 120 include one or more Local Area Networks (LANs), one or more Wide Area Networks (WANs), the Internet, or any combination thereof.

Multimedia server 130 receives a multimedia data stream from mobile device 110 over network 120. Multimedia server 130 performs a number of enhancements both in real-time and after an entire multimedia data stream is transmitted to multimedia server 130 in order to improve the perceived video quality. Subsequently, multimedia server 130 transmits the enhanced multimedia data stream to one or more of devices 140A-N. Multimedia server 130 may transmit the enhanced multimedia data streams over HTTP connections in response to HTTP requests from one or more of devices 140A-N, for example.

Devices 140A-N may receive a multimedia data stream in a real-time mode and/or a playback mode. Browsers (e.g., Mozilla Firefox) on devices 140A-N allows users to view the multimedia data stream in real-time and/or on-demand (i.e., non-real-time), after all or a substantial portion of the multimedia data stream has been received and stored at multimedia server 130. One or more of devices 140A-N may be mobile devices (similar to mobile device 110) or non-mobile devices, such as a desktop computer.

Mobile Device for Live Streaming

Figure 2:
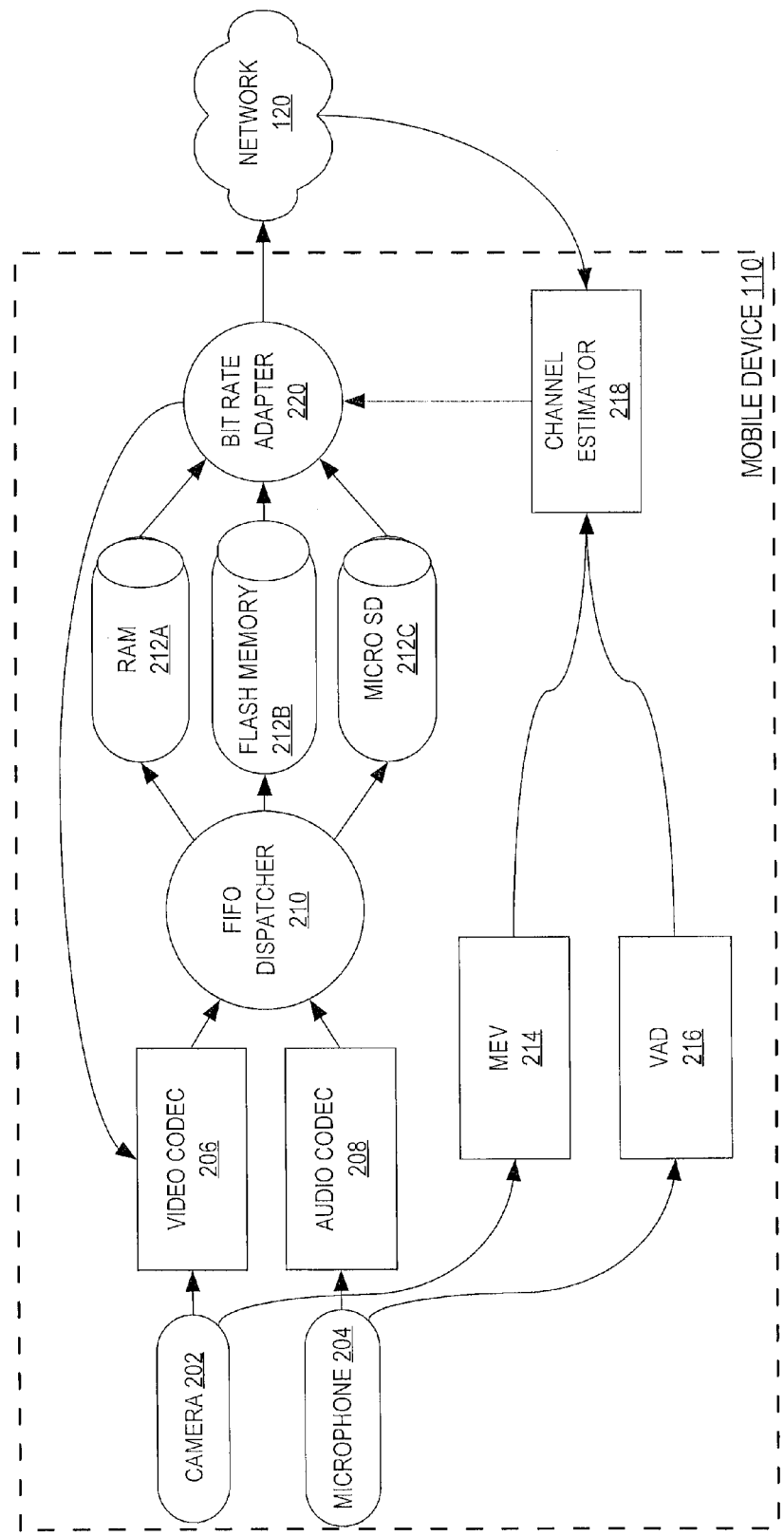
FIG. 2 is a block diagram that depicts components of a mobile device, according to an embodiment of the invention.

FIG. 2 is a block diagram that depicts components of mobile device 110, according to an embodiment of the invention. According to FIG. 2, mobile device 110 includes: a camera 202 for capturing video; a microphone 204 for capturing audio; a video codec 206 for encoding the captured video; a audio codec 208 for encoding the captured audio; a first-in-first-out (FIFO) dispatcher 210 for pushing the encoded data to one of three storage areas 212A-C on mobile device 110; random access memory (RAM) 212A; flash memory 212B; micro secure digital (SD) 212C; a motion estimation for video (MEV) module 214; a voice activity detection (VAD) module 216; a channel estimator 218; and a bit rate adapter 220. The storages 212A-C are not limited to the types depicted in FIG. 2. For example, mobile device 110 may additionally or alternatively include hard disk drives (HDDs), mini-SDs, SDs, and Compact Flash. The different types of storage vary in terms of size and read/write access speed.

Video codec 206, audio codec 208, FIFO dispatcher 210, MEV 214, VAD 216, channel estimator, and bit rate adapter 220 may be implemented in computer hardware, computer software, or any combination of computer hardware and computer software.

Video and Audio Codecs

Much of the quality-related techniques described herein are applied to the encoded multimedia streams on the sending device. As depicted in FIG. 2, multimedia data is encoded by video codec 206 and audio codec 208 as the data is being captured by camera 202 and microphone 204. A codec is a device or program capable of encoding and/or decoding a digital data stream or signal. Many mobile devices contain embedded audio/voice codecs (for example, GSM AMR) and video codecs (most commonly H.263). Such codecs may be optimized by the manufacturer of mobile devices in order to run efficiently on those devices.

The various codecs have different technical characteristics that require different techniques for optimizing the live and playback experience. There are at least two types of codecs. The first type of codec is one whose bit rate must be fixed at the beginning of recording and cannot be varied. The second type of codec is one whose bit rate can be changed in real-time while streaming is occurring.

For both types of codecs, there are at least two additional variations that impact the technique required for optimization of live and playback streams. The first variation is a codec that supports bit rate scalability, i.e., the possibility to transmit only certain portions of each encoded (and compressed) frame without losing the ability to decode the data stream. One result of sending a frame of video in this manner may include "fuzziness" (e.g., due to the lower image resolution resulting from less data being transmitted) of the video when that frame of video is viewed in real-time on one of devices 140A-N.

The second variation is a codec that does not support bit rate scalability, i.e., it is not possible to skip parts of encoded frames while keeping the ability to further decode those frames. In other words, the bit rate of the multimedia data stream being transmitted in real-time equals the bit rate at which the multimedia data stream is being captured.

In an embodiment, video codec 206 and audio codec 208 encode, respectively, the captured video and audio according to certain quality parameters. These quality parameters are set before or during capture of the video/audio. The quality parameters are set either automatically within certain limits based on the available bandwidth of the communications link to multimedia server 130 or manually selected by the user. For example, if, at the beginning of the transmission of a live stream, the bandwidth of the communications link to multimedia server 130 is relatively low, then the quality parameters of video codec 206 and audio codec 208 are set relatively low. The relatively low quality parameters cause the respective codecs to encode the captured data at a lower bit rate, which is more likely to result in lower quality as perceived by a viewer associated with one of devices 140A-N. Code parameter tuning influences quality irreversibly and is done within reasonable limits to achieve better perceptible quality in live mode while keeping on-demand quality acceptable.

FIFO Dispatcher

According to FIG. 2, encoded data from video codec 206 and audio codec 208 are stored, on mobile device 110 via FIFO dispatcher 210, into multiple types of available memory. In this case, the available memory includes volatile memory (e.g., RAM 212A) and non-volatile or persistent memory (e.g., flash memory 212B and micro SD 212C) that retains data even without an electrical power input. First, FIFO dispatcher 210 stores the encoded data into RAM 212A. It is preferable to write to and read from RAM 212A because doing so is much faster relative to writing to and reading from persistent memories, such as flash memory 212B and micro SD 212C.

A separate asynchronous storing process associated with FIFO dispatcher 210 stores the same encoded data into one of the persistent memories, such as flash memory 212B or micro SD 212C, depending on free space availability. At the same time, if RAM 212A is almost full, then some frames may be removed from RAM 212A if those frames are saved in one of the persistent memories, regardless of the delivery status of those frames (whether or not they were confirmed to be received by multimedia server 130).

Another asynchronous reader/sender process (associated with FIFO dispatcher 210, bit rate adapter 220, and memory components 212A-C) reads encoded data from one of memory components 212A-C (preferably from RAM 212A, but if packet has already been removed from RAM 212A, then from 212B or 212C) and sends the encoded data to multimedia server 130 via network 120. The reading process may skip some of the frames in "live" mode for the sake of delay minimization, as controlled by bit rate adapter 220. However, such packets will be sent later during or after "live" mode.

Because encoded data is stored in persistent memory in addition to being stored in RAM 212A, if mobile device 110 powers down (e.g., due to battery power being depleted), then the encoded data that has not been sent via network 120 remains persistently stored. If encoded data was only buffered in RAM 212A (which is volatile memory), then a power down of mobile device 110 would cause that buffered data to be lost.

Motion Estimation and Voice Activity Detection

As depicted in FIG. 2, mobile device 110 includes MEV 214 and VAD 216. Although depicted as separate from video codec 206 and audio codec 208, respectively, MEV 214 and VAD 216 may be components of video codec 206 and audio codec 208, respectively.

MEV 214 detects motion within video data that is captured by camera 202. For example, camera 202 may be capturing video of a street corner where no cars or pedestrians or other objects are moving through the view. As soon as an object, such as a car, moves into the view of camera 202, MEV 214 detects that motion and sends, to channel estimator 218, information about which frames are associated with the detected motion. With this information, if certain portions of captured video are associated with little or no detected movement, then those portions may be skipped entirely during transmission in order to adapt to a lower available bandwidth of the communications link with multimedia server 130. Because only portions of video associated with little or no motion are discarded for live transmission, the reduction in quality (in terms of interruptions and jerkiness) from the perspective of the viewers of the live stream is minimized.

Similarly, VAD 216 detects voice activity in audio data. When changes in voice activity are detected, VAD 216 sends, to channel estimator 218, information about which frames are associated with the detected changes in audio. With this information, if certain portions of audio are associated with relative silence, then those portions may be skipped entirely during transmission in order to adapt to a lower available bandwidth of the communications link with multimedia server 130. Because only portions of audio associated with relative silence are discarded for live transmission, the reduction in quality (in terms of interruptions and jerkiness) from the perspective of the viewers of the live stream is minimized.

Channel Estimator and Bit Rate Adapter

As depicted in FIG. 2, mobile device 110 includes channel estimator 218 and bit rate adapter 220. Channel estimator 218 receives information about network 120. For example, the information indicates the number of packets that have or have not been successfully delivered to multimedia server 130. Based on this information, channel estimator 218 estimates an allowable bit rate that the communication channel (or link), established with multimedia server 130 via network 120, can support.

Depending on the underlying network transport protocol used, the number of packets that have or have not been successfully delivered to multimedia server 130 may be calculated in the following ways. For protocols with explicit packet acknowledgement, the number of packets that have or have not been successfully delivered to multimedia server 130 is received directly from network protocol stack. For protocols (e.g., TCP protocol) with packet acknowledgement handled by a network protocol stack, no individual delivery confirmation provided to application level, but which employs a flow control mechanism to manage the size of an output buffer on unacknowledged packets, the speed at which the output buffer drains is measured. For protocols without acknowledgement, multimedia server 130 reports (e.g., periodically), to mobile device 110, the number of packets that have or have not been successfully delivered.

Bit rate adapter 220 receives the estimated allowable bit rate information from channel estimator 218. Based on this information, bit rate adapter 220 may modify quality parameters of video codec 206 and/or audio codec 208 if codecs 206 and 208 support dynamic modification of those parameters, or bit rate adapter 210 can effectively modify outgoing bit rate of the frames being sent by sending only a portion of each frame for bit rate scalable codecs, which is described in more detail below. Bit rate adapter 220 may also skip one or more video key and/or non-key frames (i.e., ensure that those key frames are not transmitted to multimedia server 130) in order to reduce the actual bit rate to a bit rate that is the same as or lower than the estimated allowable bit rate. If any video frames are dropped, then dropping continues at least until the next key frame.

Optimizing Live Stream Based on Presence of Subscribers

In an embodiment, the presence of subscribers to (or viewers of) the live stream generated by mobile device 110 is taken into consideration while mobile device 110 processes the live stream. For example, if no one is viewing the live stream that is transmitted to multimedia server 130 (regardless of whether one or more users were invited), then there is no need to transmit a low quality multimedia data stream to reduce latency. Instead, while multimedia server 130 is not transmitting a live stream to any device 140A-N, mobile device 110 transmits a high quality stream (e.g., without removing portions of frames of video and without skipping frames of video data). Mobile device 110 transmits this high quality stream even if the high quality stream is associated with a relatively high latency (i.e., significant delay between capture and receipt) that is unacceptable for "live" viewing.

As soon as multimedia server 130 accepts a live subscription request from one of devices 140A-N, multimedia server 130 informs mobile device 110 that one or more subscribers request a live transmission of the data stream. In response, mobile device 110 switches from a high quality mode to a live transmission mode, which mode may or may not require transmitting a lower quality data stream relative to the portion of the data stream that was already transmitted to multimedia server 130. If the latency in the transmission of the high quality data stream from mobile device 110 exceeds a particular latency threshold, then mobile device 110 skips one or more unsent data packets (that have not yet been transmitted to multimedia server 130) and instead sends a "live" data stream (that has not exceeded the particular latency threshold). In order to keep the latency of the data stream below the particular latency threshold, mobile device 110 may be required to first reduce the quality of the unsent data stream before transmitting the stream to multimedia server 130.

In an embodiment, mobile device 110 detects that there are no live subscribers during the live transmission of a data stream. In response, mobile device 110 changes from a live transmission mode to a high quality transmission mode. As a result, mobile device 110 transmits the data stream at the highest available quality (e.g., no skipped frames and no reduction of the bit rate) even if the resulting latency exceeds a latency threshold (e.g., 1 second from data capture to data transmission).

Optimizing Quality and Delay During Live Transmission Based on Viewer Feedback

In an embodiment, the quality of a live transmission of a data stream from mobile device 110 to multimedia server 130 changes based on one or more criteria associated with one or more viewers of devices 140A-N. Such criteria may include feedback from one or more of devices 140A-N and the privacy settings associated with one or more viewers of those devices. For example, viewers of a live transmission (using devices 140A-N) might not be interacting with mobile device 110 in any meaningful way; such viewers might only be viewing the captured video or listening to the captured audio. In such a scenario, it might not be critical that there is a significant delay between capture time at mobile device 110 and transmission time from multimedia server 130. But in response to a real-time interaction (e.g., a voice or text message) from a viewer's device (e.g., one of devices 140A-N) to mobile device 110, mobile device 110 switches from a high quality (or high latency) mode to a live transmission mode. Such a switch may result in certain frames (whether key or non-key frames) being skipped, performing certain lossy compression techniques, and/or reducing the bit rate in order to reduce the latency below a particular latency threshold.

As another example, a user of mobile device 110 may have a privacy setting that indicates that any captured multimedia data is private to the user and cannot be shared with users of devices 140A-N. As a result, such multimedia data is streamed to multimedia server 130 in a high quality transmission mode regardless of latency. However, during the transmission, the user of mobile device 110 may change the privacy setting to indicate that captured multimedia data is to be shared with other users. In response to this change, mobile device 110 switches from the high quality mode to a live transmission mode that ensures that the transmission latency is below a latency threshold. Consequently, some multimedia data that is buffered in RAM 212A or flash memory 212B may be skipped during transmission, as well as certain key frames. Additionally or alternatively, if codecs 206 and 208 support bit rate scalability, then the bit rate of the captured multimedia data may be reduced (even after having been encoded and stored).

Optimizing Live Stream During Live Transmission Based on Available Bandwidth

In typical mobile devices, a user is required to select one of multiple types of communication channels, e.g., Wi-Fi and 3G. In response to the selection of one of the two types, the mobile device determines the bit rate at which the captured data is encoded. Afterwards, the theoretical available capacity of the communication channel is not accounted for in adjusting the bit rate. However, according to an embodiment of the invention, the currently available bandwidth of the communication channel is constantly (or periodically) monitored and is used by bit rate adapter 220 to adjust the amount of information per time unit that is transmitted to multimedia server 130. In other words, in one embodiment, bit rate adapter 220 dynamically and continuously adjusts the bit rate based on currently available bandwidth.

If codecs 206 and 208 encode a data stream at a lower quality (i.e., a relatively low bit rate) then the non-encoded portion of the data stream is not recoverable. Therefore, codecs should not lower the bit rate too much in order to keep the quality of the data stream acceptable. One reason that the bit rate is reduced at all is to make a better tradeoff between live and non-live qualities.

One way to reduce the amount of information per time unit that is transmitted to multimedia server 130 is through "scaling" the bit rate. Some codecs support bit rate scalability, whereas other codecs do not. If a codec supports bit rate scalability and the available bandwidth is such that the transmission of the data stream at the current bit rate will experience unacceptable latency, then only certain portions of each frame are transmitted to multimedia server 130. Sending selected portions of a frame is performed by reading a smaller portion of the frame from one of memories 212A-C, while the complete frame remains in memory at least until the frame is fully transmitted to multimedia server 130 later. As a result, the viewers of the data stream at devices 140A-N will not experience significant (or any) interruptions or gaps in the live transmission of the data stream. Instead, the viewers may experience "fuzziness" in the displayed video or some lack of clarity in the audio.

If mobile device 110 does not support a bit rate scalable codec, but has enough free CPU resources available, then a lower bit rate frame may be generated by re-encoding the high quality large frame into a lower quality small frame, for the sake of a live transmission. Such re-encoding would be performed by a second video codec, which is not depicted in FIG. 2 for the sake of simplicity. Later, either during or after the live transmission, the high quality frames that correspond to the re-encoded frames may be sent to multimedia server 130. As a result of this re-encoding technique, the viewers of the data stream at devices 140A-N will not experience significant (or any) interruptions or gaps in the live transmission of the data stream. Instead, the viewers may experience "fuzziness" in the displayed video or some lack of clarity in the audio.

Another way to reducing the amount of data transmitted to multimedia server 130 in order to reduce latency or keep latency within an allowable threshold is for bit rate adapter 220 to skip one or more key frames (also referred to as "I frames") and non-key frames (also referred to as "B frames" and "P frames") in the data stream. These key frames may be identified based on information from MEV 214 and/or VAD 216 in order to reduce the loss of useful information during live streaming. Generally, frames that are accompanied by motion are more interesting to viewers than are frames that are accompanied by no motion. Similarly, frames that are accompanied by audio are generally more interesting to viewers than are frames that are accompanied by no audio. This technique of skipping frames may be used for codecs that support bit rate scalability and for codecs that do not support bit rate scalability. However, modifying the codec bit rate is generally preferable to skipping frames because skipping frames tends to result in "choppiness" of the live video (as perceived by viewers), whereas modifying the bit rate is not associated with such choppiness.

Optimizing Multimedia Quality for Playback Clients

Although mobile device 110 may be transmitting a live data stream to multimedia server 130, one of more of devices 140A-N may request to view the data stream in a "non-live" (or "on-demand" or "playback") mode. Such devices are referred to herein as "playback clients." For playback clients, high quality transmission of a data stream is more important than a live or near live transmission of the data stream. Therefore, multimedia server 130 optimizes the live transmission of the data stream to generate a higher quality version of the data stream.

During live transmission of a data stream, mobile device 110 may have omitted some information from the initially captured and encoded data before sending the data stream to multimedia server 130. Such information is referred to hereinafter as "omitted information." Because mobile device 110 retains a high quality version of the data stream or at least the omitted information, mobile device 110 eventually transmits that omitted information to multimedia server 130. Examples of omitted information include (a) key and non-key frames that were skipped and (b) any portions of frames that were not transmitted to multimedia server 130 as a result of bit rate scaling.

Mobile device 110 may transmit the omitted information to multimedia server 130 after mobile device 110 completes the live streaming of the data stream. Additionally or alternatively, mobile device 110 may transmit any omitted information to multimedia server 130 during the live transmission of the data stream (i.e., before the live transmission completes). This may be performed during live transmission if, for example, there is sufficient bandwidth and/or there are no current subscribers to the live transmission.

In an embodiment, mobile device 110 keeps track of the omitted information. For example, the tracking of omitted information may be in the form of retaining the packet sequence numbers that were not transmitted to multimedia server 130. In an alternative embodiment, multimedia server 130 keeps track of which information was omitted. In this embodiment, multimedia server 130 reports to mobile device 110 the packets that have and/or have not been received at multimedia server 130.

Processing a Multimedia Data Stream at a Multimedia Server

Figure 3:
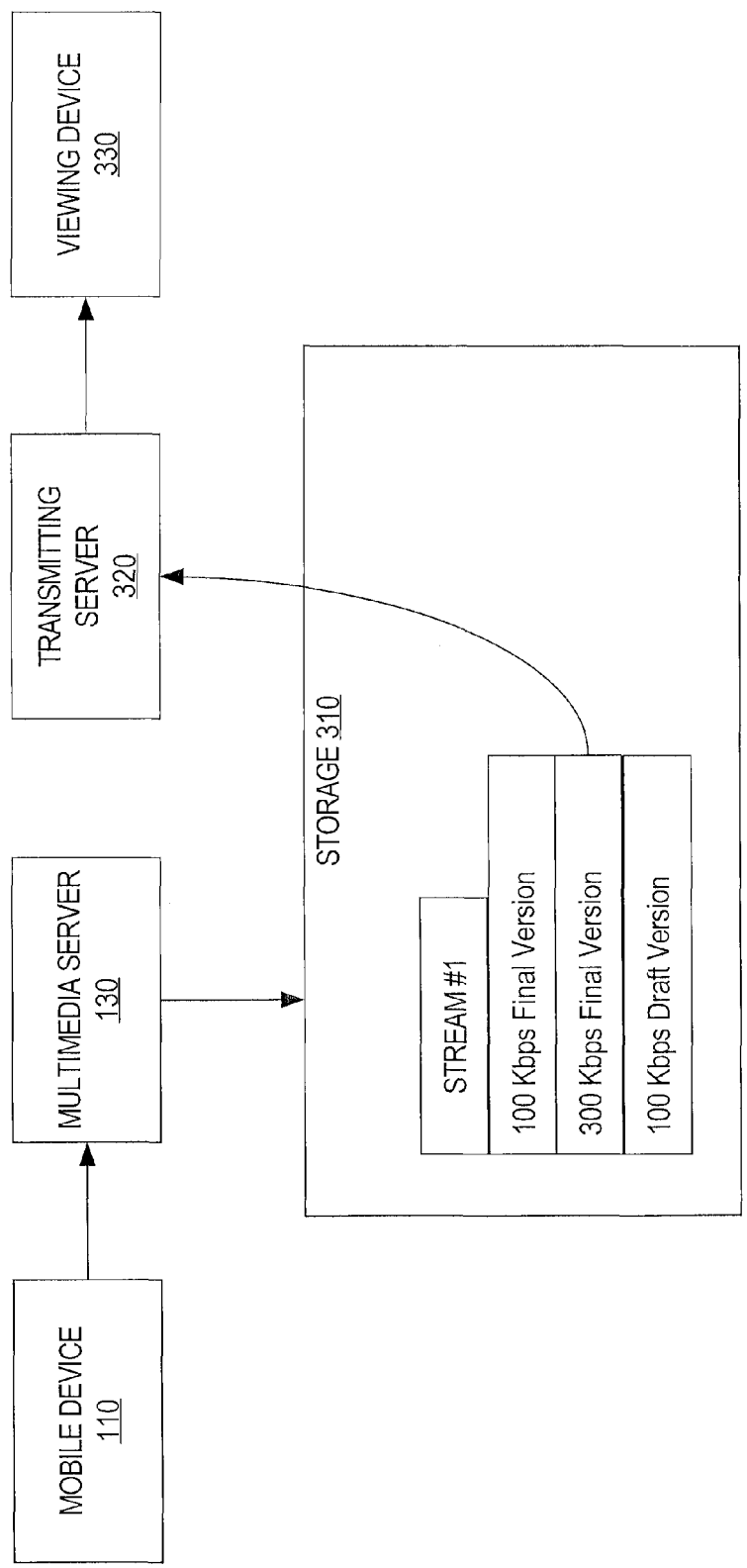
FIG. 3 is a block diagram that depicts storing multiple versions of multimedia data, according to an embodiment of the invention.

FIG. 3 is a block diagram that depicts storing multiple versions of multimedia data, according to an embodiment of the invention. As depicted in FIG. 3, mobile device 110 sends a multimedia data stream (e.g., over network 120) to multimedia server 130. Multimedia server 130, in turn, stores the multimedia data stream in a storage 310. Storage 310 may be a local file system or database in case of a single server setup. Alternatively, in case of a multi-server setup, storage 310 may be a network file system or distributed file system or other storage with remote access capabilities.

The multimedia data stream stored in storage 310 is uniquely identified from other data streams stored in storage 310 by an identifier, such as "Stream #1" as in FIG. 3. Multimedia server 130 may generate several draft (live) and final (on-demand) versions of a data stream, which versions may differ in quality, codecs used, bitrate, and other settings. As depicted in FIG. 3, storage 310 includes three versions of Stream #1: a 100 Kbps final version, a 300 Kbps final version and a 100 Kbps draft version. The draft version is the version of Stream #1 that mobile device 110 transmitted in a live transmission mode. Both final versions were generated by multimedia server 130 based on omitted information that mobile device 110 transmitted to multimedia server 130 during or after the live transmission.

As depicted in FIG. 3, one of the final versions has a higher bit rate (i.e., 300 Kbps) and the other final version has a lower bit rate (i.e., 100 Kbps). Additionally, multimedia server 130 may perform, on the multimedia data stream, one or more operations, such as the operations listed below. For example, multimedia server 130 may perform a two-pass compression operation on a data stream to generate a higher quality final (on-demand) data stream ready for transmission to a viewing device 330.

In an embodiment, multimedia server 130 performs one or more "on-the-fly" operations on a live data stream to generate a number of versions of the data stream. An "on-the-fly" operation is an operation that is executed sufficiently fast that the operation does not fall behind the rate at which the data stream is intended to flow through to one or more of devices 140A-N (i.e., the operation does not exceed a particular latency threshold).

Generally, each new version of a multimedia data stream will have better quality than a previous version of the same data stream. In addition to quality, each version of a data stream may differ in numerous other ways, such as: (a) file format (e.g., Adobe Flash FLV, $3^{rd}$ Generation Partnership Project (3GPP), and ISO MPEG4); (b) codecs used (e.g., H.263 and H.264); (c) additional data (e.g., Real-time Transport Protocol (RTP) Hint Tracks in ISO/IEC 14496-12); and (d) bit rate. Additionally, the data streams may be associated with different protocols, such as RTP, RTSP, and Adobe Real Time Messaging Protocol (RTMP).

Viewing device 330 receives a version of Stream #1 through a transmitting server 320. Viewing device 330 may be one of devices 140A-N in FIG. 1. Transmitting server 320 may be a Flash Media server or a Real Time Streaming Protocol (RTSP) server or other type of server. Although FIG. 3 depicts multimedia server 130 separately from transmitting server 320, multimedia server 130 and transmitting server 320 may be part of the same process or may be different processes that execute on the same computer.

Viewing device 330 receives the version of Stream #1 either as a result of viewing device 330 requesting Stream #1 or as a result of mobile device 110 instructing multimedia server 130 (or transmitting server 320) to send the data stream to viewing device 330. In either case, transmitting server 320 determines which version of Stream #1 to transmit to viewing device 330. This determination is based on one or more criteria, such as the available bandwidth of the communications link between transmitting server 320 and viewing device 330, the preferences (e.g., live or on-demand data transmission) of the user of viewing device 330, the current load on transmitting server 320, and the capabilities of viewing device 330. Such capabilities may include resolution, screen size, memory, and storage capacity. Transmitting server 320 may also base this determination on the data format in which each of the data stream versions are stored.

The following are non-limiting examples of transformations that multimedia server 130 may perform on a live or on-demand version data stream:
 a. Video transcoding (i.e., from one compression method to another compression method and/or from one bit rate to another bit rate)
 b. Video picture size change
 c. Video de-noising (i.e., removing "noise" from the video)
 d. Video de-blocking (i.e., smoothing the sharp edges which can form between blocks in decoded video when block coding techniques are used. De-blocking improves the visual quality of decoded pictures)
 e. Video image stabilization (i.e., concealment of camera shaking)
 f. Video image sharpening/blur removal
 g. Video color balance, contrast, and brightness adjustment
 h. Video special effects, such as converting to a grayscale palette
 i. Video frame rate conversion (either up or down), e.g., using motion estimation
 j. Concealment of lost video packets, e.g., using motion estimation
 k. Audio de-noising
 l. Audio level correction
 m. Concealment of lost audio packets
 n. Text character set conversion (e.g., from a specific encoding supported by mobile device 110 to a Unicode format used on multimedia server 130)

FIG. 4A is a block diagram that depicts an example multimedia stream transformation performed by multimedia server 130 for a low delay (or live) transmission, according to an embodiment of the invention. According to FIG. 4A, multimedia server 130 receives a ITU-T H.263 stream 410A. ITU-T H.263 stream 410A is a data stream that is encoded based on the video codec standard of the same name. Multimedia server 130 then transcodes the decoded multimedia data stream (e.g., from one bit rate to another bit rate) with a transcoding module 410B to generate a ITU-T H.264 stream 410C. ITU-T H.264 stream 410C is a data stream that is encoded based on the video codec standard of the same name. Multimedia server 130 then transmits ITU-T H.264 stream 410C to one of devices 140A-N (not shown). Embodiments of the invention are not limited to these listed codecs. Multimedia server 130 may use one or more other codecs depending on various factors, such as system setup, codecs available at mobile device 110, and codecs available at one or more of devices 140A-N.

FIG. 4B is a block diagram that depicts examples of multimedia stream transformations that multimedia server 130 may perform for a live transmission, but are more likely to be performed for an on-demand (or recorded) transmission due to, e.g., high computational complexity and possible incurred delay, according to an embodiment of the invention. According to FIG. 4B, multimedia server 130 receives a ITU-T H.263 stream 420A. Multimedia server 130 then decodes and decompresses ITU-T H.263 stream 420A using a decoder/decompressor 420B. Multimedia server 130 then performs a de-blocking operation on the decoded and decompressed data stream using a deblocking module 420C. Subsequently, multimedia server 130 performs a frame rate upsampling operation on the data stream using a frame rate upsampler module 420D. Multimedia server 130 then compresses and encodes the data stream using an encoder/compressor 420E to generate a ITU-T H.264 stream 420F. Multimedia server 130 then transmits ITU-T H.264 stream 420F to one of devices 140A-N (not shown). Again, embodiments of the invention are not limited to these listed codecs. Multimedia server 130 may use one or more other codecs depending on various factors, such as system setup, codecs available at mobile device 110, and codecs available at one or more of devices 140A-N.

In an embodiment, multimedia server 130 processes a multimedia data stream gradually, instead of all at once. This may be done to optimize server CPU utilization. For example, multimedia server 130 produces one version (e.g., a "live" version) of a multimedia data stream performing few or no transformations on the data stream. Subsequently, using a background or other low priority process, multimedia server 130 generates a higher quality version of the multimedia data stream using one or more of the transformations listed above. For example, during a first period of time, multimedia server 130 performs a video de-noising operation on a live data stream. During a second period of time (that is subsequent to and does not overlap the first period of time), multimedia server 130 performs a video de-blocking operation on the data stream. During a third period of time (that is subsequent to and does not overlap the second period of time), multimedia server 130 performs an image sharpening operation on the data stream. In between each stage (or period of time), the data stream is available for transmission to viewing device 330. In this fashion, the quality of a live data stream is gradually improved over time without having to make all desired enhancements to the data stream before the data stream is available for transmission.

Hardware Overview

Figure 5:
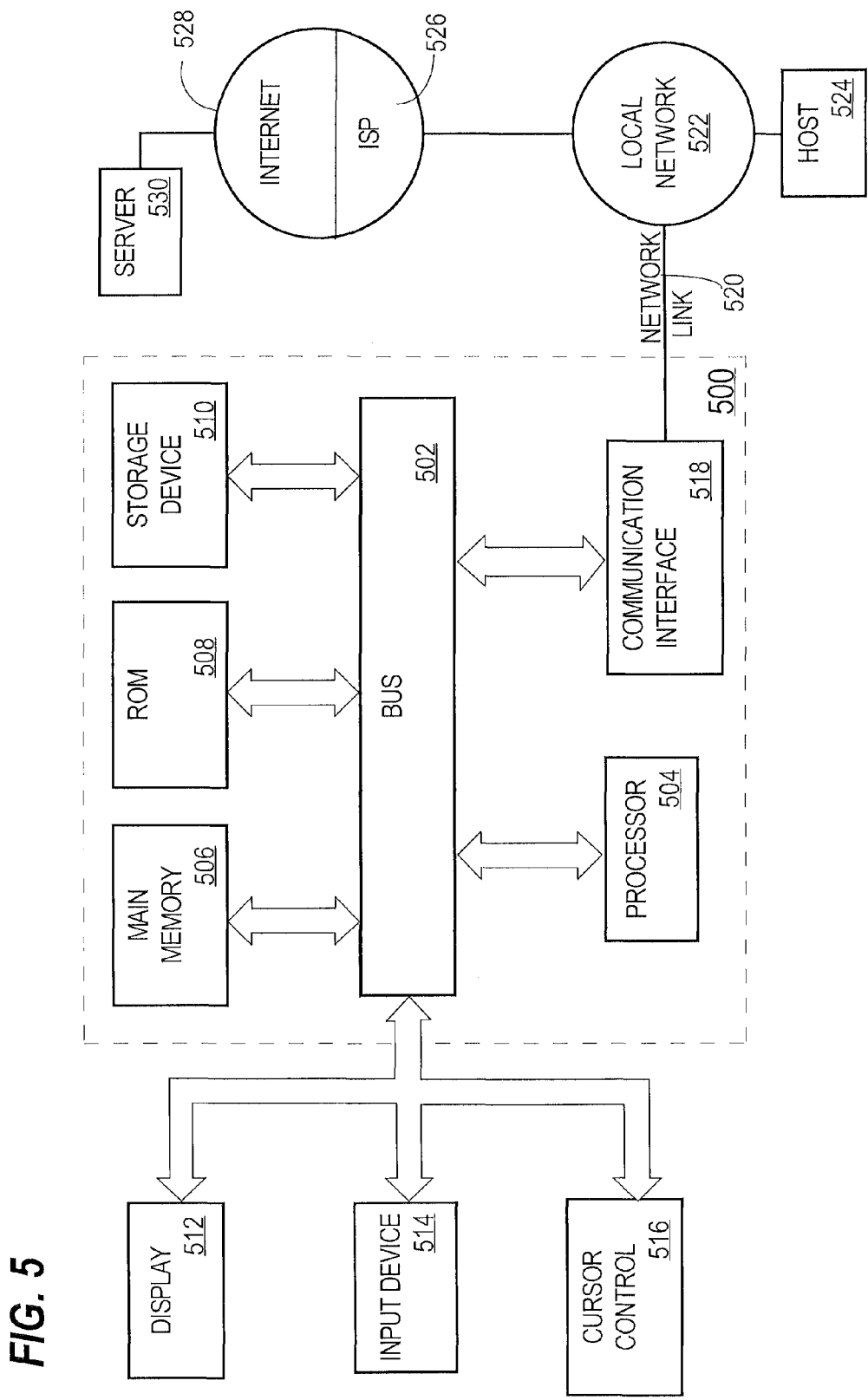
FIG. 5 is a block diagram that depicts a computer system upon which an embodiment of the invention may be implemented

FIG. 5 is a block diagram that depicts a computer system 500 upon which an embodiment of the invention may be implemented. For example, mobile device 110 and multimedia server 130 may be implemented upon computer system 500. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method comprising:
capturing a multimedia data stream on a device;
while the device is in a real-time streaming mode:
  performing one or more operations on a first portion of the multimedia data stream to remove data from the first portion;
  tracking the removed data from the first portion at the device;
  sending, to a server via a network, data from the first portion that was not removed by performing the one or more operations to enable real-time streaming of a first version of the multimedia data stream for live viewing at one or more subscriber devices; and
  sending, to the server via the network, the removed data from the first portion after said sending, to the server via the network, the data from the first portion that was not removed, the sending the removed data effective to cause the server to generate and store a second version of the multimedia data stream for on-demand viewing by combining the data from the first portion that was not removed and the removed data, a quality of the second version of the multimedia data stream for on-demand viewing higher relative to the first version of the multimedia data stream for live viewing.

2. The method of claim 1, wherein the sending the data from the first portion that has been removed as a result of performing the one or more operations is performed while the device is streaming a second portion of the multimedia data to the server in a real-time manner.

3. The method of claim 1, further comprising before performing the one or more operations:
determining that no subscriber has subscribed for the live viewing of the multimedia data stream;
in response to determining that no subscriber has subscribed for the live viewing of the multimedia data stream, processing a particular portion of the multimedia data stream without regard to a delay between (a) capturing the particular portion of the multimedia data stream at the device and (b) transmitting the particular portion of the multimedia data stream to the server;
determining that a subscriber has subscribed for the live viewing of the multimedia data stream;
in response to determining that a subscriber has subscribed for the live viewing of the multimedia data stream, processing a second portion of the multimedia data stream with regard to an additional delay between (c) capturing the second portion of the multimedia data stream at the device and (d) transmitting the second portion of the multimedia data stream to the server.

4. The method of claim 1, further comprising before performing the one or more operations:
while no subscribers of the live viewing of the multimedia data stream are sending data to the device, processing a particular portion of the multimedia data stream without regard to a delay between (a) capturing the particular portion of the multimedia data stream at the device and (b) transmitting the particular portion of the multimedia data stream to the server;
determining that one or more subscribers of the live viewing of the multimedia data stream send data to the device;
in response to determining that one or more subscribers of the live viewing of the multimedia data stream send data to the device, processing a second portion of the multimedia data stream with regard to an additional delay between (c) capturing the second portion of the multimedia data stream at the device and (d) transmitting the second portion of the multimedia data stream to the server.

5. The method of claim 1, further comprising:
encoding the multimedia data stream to generate an encoded multimedia data;
determining whether a volatile medium on the device has enough storage space to store the encoded multimedia data;
in response to determining that the volatile medium has enough storage space:
storing the encoded multimedia data in the volatile medium; and
storing the encoded multimedia data in a non-volatile medium on the device;
determining that a portion of the encoded multimedia data was deleted from the volatile medium;
in response to determining that the portion of the encoded multimedia data was deleted from the volatile medium;
reading the portion of the encoded multimedia data from the non-volatile medium; and sending the portion of the encoded multimedia data to the server via the network.

6. The method of claim 1, wherein prior to performing the one or more operations, the method further comprising:
determining whether the multimedia data stream can be streamed in real-time at a highest quality; and
responsive to determining that the multimedia data stream cannot be streamed in real-time at the highest quality, determining to remove the data from the first portion to enable the real-time streaming of the first version of the multimedia data stream for live viewing.

7. The method of claim 6, wherein the determining whether the multimedia data stream can be streamed in real-time at a highest quality further comprises determining whether delays in the network will prevent the real-time streaming of the multimedia data stream at the highest quality for live viewing.

8. The method of claim 1, wherein the second version of the multimedia data stream for the on-demand viewing is generated and stored for non-live viewing.

9. The method of claim 1, wherein the sending the removed data is further effective to cause the server to generate the second version of the multimedia data stream by enhancing the first version of the multimedia data stream for the on-demand viewing.

10. A machine-readable storage device having instructions stored thereon that, when executed by one or more processors, cause the one or more processors to perform a method comprising:
capturing a multimedia data stream on a device;
while the device is in a real-time streaming mode:
performing one or more operations on a first portion of the multimedia data stream to remove data from the first portion;
tracking the removed data from the first portion;
sending, to a server via a network, data from the first portion that was not removed by performing the one or more operations to enable real-time streaming of a first version of the multimedia data stream for live viewing at one or more subscriber devices; and
sending, to the server via the network, the removed data from the first portion after said sending, to the server via the network, the data from the first portion that was not removed, the sending the removed data effective to cause the server to generate and store a second version of the multimedia data stream for on-demand viewing by combining the data from the first portion that was not removed and the removed data, a quality of the second version of the multimedia data stream for on-demand viewing higher relative to the first version of the multimedia data stream for live viewing.

11. The machine-readable storage device of claim 10, wherein the sending the data from the first portion that has been removed as a result of performing the one or more operations is performed while the device is streaming a second portion of the multimedia data to the server in a real-time manner.

12. The machine-readable storage device of claim 10, wherein the instructions, when executed by the one or more processors, cause the one or more processors to perform a method further comprising, before performing the one or more operations:
determining that no subscriber has subscribed for the live viewing of the multimedia data stream;
in response to determining that no subscriber has subscribed for the live viewing of the multimedia data stream, processing a particular portion of the multimedia data stream without regard to a delay between (a) capturing the particular portion of the multimedia data stream at the device and (b) transmitting the particular portion of the multimedia data stream to the server;
determining that a subscriber has subscribed for the live viewing of the multimedia data stream;
in response to determining that a subscriber has subscribed for the live viewing of the multimedia data stream, processing a second portion of the multimedia data stream with regard to an additional delay between (c) capturing the second portion of the multimedia data stream at the device and (d) transmitting the second portion of the multimedia data stream to the server.

13. The machine-readable storage device of claim 10, wherein the instructions, when executed by the one or more processors, cause the one or more processors to perform a method further comprising, before performing the one or more operations:
while no subscribers of the live viewing of the multimedia data stream are sending data to the device, processing a particular portion of the multimedia data stream without regard to a delay between (a) capturing the particular portion of the multimedia data stream at the device and (b) transmitting the particular portion of the multimedia data stream to the server;
determining that one or more subscribers of the live viewing of the multimedia data stream send data to the device;
in response to determining that one or more subscribers of the live viewing of the multimedia data stream send data to the device, processing a second portion of the multimedia data stream with regard to an additional delay between (c) capturing the second portion of the multimedia data stream at the device and (d) transmitting the second portion of the multimedia data stream to the server.

14. The machine-readable storage device of claim 10, wherein the instructions, when executed by the one or more processors, cause the one or more processors to perform a method further comprising:
encoding the multimedia data stream to generate an encoded multimedia data;
determining whether a volatile medium on the device has enough storage space to store the encoded multimedia data;
in response to determining that the volatile medium has enough storage space:
storing the encoded multimedia data in the volatile medium; and
storing the encoded multimedia data in a non-volatile medium on the device;
determining that a portion of the encoded multimedia data was deleted from the volatile medium;
in response to determining that the portion of the encoded multimedia data was deleted from the volatile medium;
reading the portion of the encoded multimedia data from the non-volatile medium; and
sending the portion of the encoded multimedia data to the server via the network.

15. The machine-readable storage device of claim 10, wherein the instructions, when executed by the one or more processors, cause the one or more processors to perform a method further comprising, prior to performing the one or more operations:

determining whether the multimedia data stream can be streamed in real-time at a highest quality; and responsive to determining that the multimedia data stream cannot be streamed in real-time at the highest quality, determining to remove the data from the first portion to enable the real-time streaming of the first version of the multimedia data stream for live viewing.

16. The machine-readable storage device of claim 15, wherein the determining whether the multimedia data stream can be streamed in real-time at a highest quality further comprises determining whether delays in the network will prevent the real-time streaming of the multimedia data stream at the highest quality for live viewing.

17. The machine-readable storage device of claim 10, wherein the second version of the multimedia data stream for the on-demand viewing is generated and stored for non-live viewing.

18. The machine-readable storage device of claim 10, wherein the sending the removed data is further effective to cause the server to generate the second version of the multimedia data stream by enhancing the first version of the multimedia data stream for the on-demand viewing.

19. A method comprising:
receiving, at a server, a multimedia data stream from a device that is in a real-time streaming mode, the multimedia data stream having a portion of data removed by the device;

streaming in real-time a live version of the multimedia data stream to one or more subscriber devices for live viewing;

after said receiving, at the server, the multimedia data stream having the portion of data removed by the device, receiving, at the server, the portion of the data that was removed from the multimedia data stream; and combining the portion of the data that was removed with the multimedia data stream to generate an on-demand version of the multimedia data stream and storing the on-demand version of the multimedia data stream at the server for on-demand viewing by one or more subscriber devices, the on-demand version of the multimedia data stream having a higher quality relative to the live version of the multimedia data stream.

20. The method of claim 19, wherein the on-demand version of the multimedia data stream is generated and stored for non-live viewing.

* * * * *